United States Patent
Suga et al.

(10) Patent No.: US 12,556,278 B2
(45) Date of Patent: Feb. 17, 2026

(54) WIRELESS COMMUNICATION SYSTEM AND WIRELESS COMMUNICATION METHOD

(71) Applicant: NTT, Inc., Tokyo (JP)

(72) Inventors: Mizuki Suga, Musashino (JP); Kota Ito, Musashino (JP); Takuto Arai, Musashino (JP); Yushi Shirato, Musashino (JP); Naoki Kita, Musashino (JP)

(73) Assignee: NTT, Inc., Tokyo (JP)

( * ) Notice: Subject to any disclaimer, the term of this patent is extended or adjusted under 35 U.S.C. 154(b) by 250 days.

(21) Appl. No.: 18/274,012

(22) PCT Filed: Feb. 12, 2021

(86) PCT No.: PCT/JP2021/005344
§ 371 (c)(1),
(2) Date: Jul. 25, 2023

(87) PCT Pub. No.: WO2022/172413
PCT Pub. Date: Aug. 18, 2022

(65) Prior Publication Data
US 2024/0413905 A1 Dec. 12, 2024

(51) Int. Cl.
*H04B 10/2575* (2013.01)
*H04J 14/02* (2006.01)

(52) U.S. Cl.
CPC ... *H04B 10/2575* (2013.01); *H04B 10/25752* (2013.01); *H04J 14/02* (2013.01)

(58) Field of Classification Search
CPC ......... H04B 10/2575–25759; H04B 10/25752; H04J 14/02

(Continued)

(56) References Cited

U.S. PATENT DOCUMENTS 11,183,757 B2 * 11/2021 Puleri ................ H01Q 3/2676
2021/0336715 A1 * 10/2021 Kim .................... H04J 14/028

(Continued)

FOREIGN PATENT DOCUMENTS

JP  2020-120252 A  8/2020
WO WO-2020/121919 A1  6/2020

OTHER PUBLICATIONS

Ito et al.: "A novel centralized beamforming scheme for radio-over-fiber systems with fixed wavelength allocation", IEICE Communications Express, vol. 8, No. 12, 2019, pp. 584-589 (Year: 2019).*

(Continued)

*Primary Examiner* — Li Liu
(74) *Attorney, Agent, or Firm* — Harness, Dickey & Pierce, P.L.C.

(57) ABSTRACT

An aspect of the present invention is a wireless communication system including an accommodation station device and a base station device connected to the accommodation station device through an optical transmission path and having n (n is an integer of 2 or more) antenna elements, wherein a plurality of optical signals having different wavelengths propagate through the optical transmission path, the wireless communication system including a prior information acquisition unit configured to execute prior information acquisition processing for acquiring, as prior information, dispersion phase difference information that is information including a dispersion phase difference that is a phase rotation amount difference generated between adjacent optical signals on a wavelength axis due to propagation of the optical signals through the optical transmission path, and a compensation phase shift unit configured to execute compensation phase shift processing for reducing a difference from a phase difference reference that is a predetermined reference on the basis of the prior information with respect to the phase rotation amount difference generated between (Continued)

adjacent optical signals on the wavelength axis caused by wavelength dispersion in the optical transmission line.

7 Claims, 10 Drawing Sheets

(58) Field of Classification Search
USPC .......................................... 398/115–117, 195
See application file for complete search history.

(56) References Cited

U.S. PATENT DOCUMENTS

| | | | |
|---|---|---|---|
| 2022/0094459 A1* | 3/2022 | Haraguchi | ....... H04B 10/25133 |
| 2022/0109505 A1 | 4/2022 | Ito et al. | |
| 2022/0109518 A1 | 4/2022 | Ito et al. | |
| 2022/0239380 A1* | 7/2022 | Du | ......................... H04B 10/58 |

OTHER PUBLICATIONS

Yushi Shirato et al., "Millimeter-wave Band Fixed Wireless Access System using Radio over Fiber Technique", IEICE General Conference, B-5-112, 2019.

* cited by examiner

| # | PHASE ROTATION AMOUNT $\Delta\theta_i$ FROM REFERENCE WAVELENGTH (i=1) IN OPTICAL FIBER | PHASE ADJUSTMENT AMOUNT $\alpha_{[j]}$ DURING PRE-BF | | | PHASE ADJUSTMENT AMOUNT z DURING ALL ELEMENT BF |
|---|---|---|---|---|---|
| | | FIRST PRE-BF | SECOND PRE-BF | THIRD PRE-BF | |
| #1 | 0 | 0 | – | – | 0 |
| #2 | $-\Delta\beta-\varphi_2$ | $\Delta\alpha_1$ | – | – | $\Delta\alpha_1$ |
| #3 | $-2\Delta\beta-\varphi_3$ | $2\Delta\alpha_1$ | – | – | $2\Delta\alpha_1$ |
| #4 | $-3\Delta\beta-\varphi_4$ | $3\Delta\alpha_1$ | – | – | $3\Delta\alpha_1$ |
| #5 | $-4\Delta\beta-\varphi_5$ | – | $\Delta\alpha_2$ | – | $3\Delta\alpha_1+\Delta\alpha_2$ |
| #6 | $-5\Delta\beta-\varphi_6$ | – | $2\Delta\alpha_2$ | – | $3\Delta\alpha_1+2\Delta\alpha_2$ |
| #7 | $-6\Delta\beta-\varphi_7$ | – | $3\Delta\alpha_2$ | – | $3\Delta\alpha_1+3\Delta\alpha_2$ |
| #8 | $-7\Delta\beta-\varphi_8$ | – | – | $\alpha_3$ | $3\Delta\alpha_1+3\Delta\alpha_2+\Delta\alpha_3$ |
| #9 | $-8\Delta\beta-\varphi_9$ | – | – | $2\alpha_3$ | $3\Delta\alpha_1+3\Delta\alpha_2+2\Delta\alpha_3$ |
| #10 | $-9\Delta\beta-\varphi_{10}$ | – | – | $3\alpha_3$ | $3\Delta\alpha_1+3\Delta\alpha_2+3\Delta\alpha_3$ |

$\varphi_2 < \varphi_3 < \cdots < \varphi_{10}$ $\Delta\alpha_2 \approx \Delta\beta + \frac{1}{3}\sum_{j=4}^{6}\frac{\varphi_{j+1}-\varphi_j}{4}$ $\Delta\alpha_1 < \Delta\alpha_2 < \Delta\alpha_3$

Fig. 3

| RF | 60GHz |
|---|---|
| ARRAY CONFIGURATION | HALF-WAVELENGTH INTERVAL LINEAR ARRAY |
| NUMBER OF ELEMENTS (ALL ELEMENT BF) | 4 TO 32 ELEMENTS |
| NUMBER OF ELEMENTS (PRE-BF) | 4 ELEMENTS |
| WAVELENGTH BAND | 1500 nm BAND |
| WAVELENGTH INTERVAL | 100GHz |
| OPTICAL FIBER LENGTH | 10km SMF |

| | PHASE ROTATION AMOUNT $\Delta\theta_i$ FROM REFERENCE WAVELENGTH (i=1) IN OPTICAL FIBER | PHASE ADJUSTMENT AMOUNT $\alpha_v[j]$ DURING PRE-BF | | | | | | | PHASE ADJUSTMENT AMOUNT $z_v$ DURING ALL ELEMENT BF |
|---|---|---|---|---|---|---|---|---|---|
| | | FIRST | SECOND | THIRD | FOURTH | FIFTH | SIXTH | SEVENTH | |
| #1 | $\varphi_1(=0)$ | 0 | — | — | — | — | — | — | 0 |
| #2 | $-\Delta\beta-\varphi_2$ | $\Delta\alpha_1$ | 0 | — | — | — | — | — | $\Delta\alpha_1$ |
| #3 | $-2\Delta\beta-\varphi_3$ | $2\Delta\alpha_1$ | $\Delta\alpha_2$ | 0 | — | — | — | — | $\Delta\alpha_1+\Delta\alpha_2$ |
| #4 | $-3\Delta\beta-\varphi_4$ | $3\Delta\alpha_1$ | $2\Delta\alpha_2$ | $\Delta\alpha_3$ | 0 | — | — | — | $\Delta\alpha_1+\Delta\alpha_2+\Delta\alpha_3$ |
| #5 | $-4\Delta\beta-\varphi_5$ | — | $3\Delta\alpha_2$ | $2\Delta\alpha_3$ | $\Delta\alpha_4$ | 0 | — | — | $\Delta\alpha_1+\Delta\alpha_2+\Delta\alpha_3+\Delta\alpha_4$ |
| #6 | $-5\Delta\beta-\varphi_6$ | — | — | $3\Delta\alpha_3$ | $2\Delta\alpha_4$ | $\Delta\alpha_5$ | 0 | — | $\Delta\alpha_1+\Delta\alpha_2+\Delta\alpha_3+\Delta\alpha_4+\Delta\alpha_5$ |
| #7 | $-6\Delta\beta-\varphi_7$ | — | — | — | $3\Delta\alpha_4$ | $2\Delta\alpha_5$ | $\Delta\alpha_6$ | 0 | $\Delta\alpha_1+\Delta\alpha_2+\Delta\alpha_3+\Delta\alpha_4+\Delta\alpha_5+\Delta\alpha_6$ |
| #8 | $-7\Delta\beta-\varphi_8$ | — | — | — | — | $3\Delta\alpha_5$ | $2\Delta\alpha_6$ | $\Delta\alpha_7$ | $\Delta\alpha_1+\Delta\alpha_2+\Delta\alpha_3+\Delta\alpha_4+\Delta\alpha_5+\Delta\alpha_6+\Delta\alpha_7$ |
| #9 | $-8\Delta\beta-\varphi_9$ | — | — | — | — | — | $3\Delta\alpha_6$ | $2\Delta\alpha_7$ | $\Delta\alpha_1+\Delta\alpha_2+\Delta\alpha_3+\Delta\alpha_4+\Delta\alpha_5+\Delta\alpha_6+2\Delta\alpha_7$ |
| #10 | $-9\Delta\beta-\varphi_{10}$ | — | — | — | — | — | — | $3\Delta\alpha_7$ | $\Delta\alpha_1+\Delta\alpha_2+\Delta\alpha_3+\Delta\alpha_4+\Delta\alpha_5+\Delta\alpha_6+3\Delta\alpha_7$ |

Fig. 11

WIRELESS COMMUNICATION SYSTEM AND WIRELESS COMMUNICATION METHOD

CROSS-REFERENCE TO RELATED APPLICATIONS

This application is a 371 National Stage of International Application No. PCT/JP2021/005344, filed on Feb. 12, 2021. The entire disclosure of the above application is incorporated herein by reference.

TECHNICAL FIELD

The present invention relates to a wireless communication system and a wireless communication method.

BACKGROUND ART

In recent years, attention has been paid to the utilization of high-frequency bands in which a wider band than a microwave band can be used in order to respond to an increase in demand for wireless communication. However, since propagation loss in the free space increases in proportion to the square of a frequency, there is a problem that a transmission distance of high-frequency band communication becomes short and communication can be performed only in a limited area.

As a means for solving this problem, a system utilizing a radio over fiber (RoF) (hereinafter referred to as an RoF system) is known. In the RoF system, a radio base station is separated into an aggregation station and an extension station, which are connected by an optical fiber. At the time of signal transmission between the aggregation station and the extension station, a radio frequency (RF) signal is subjected to electrical-optical (E/O) conversion and transmitted through an optical fiber, and the signal is returned to the original RF signal by performing optical-electrical (O/E) conversion at a transmission destination.

According to such a configuration, long-distance transmission of high-frequency RF signals can be achieved using the RoF system. In addition, a system configuration in which functions of a base station are separated into an aggregation station and an extension station and functions of the extension station are reduced to decrease the size and power consumption and improve installability has been studied (NPL 1).

CITATION LIST

Patent Literature

[PTL 1] Japanese Patent Application Laid-open No. 2020-120252

Non Patent Literature

[NPL 1] Hiroshi Shirato, Kodai Ito, Mizuki Suga, Kazuto Goto, Hideki Toshinaga, and Naoki Kita, "Proposal of millimeter wave FWA system to which RoF is applied," IEICE General Conference, B-5-112, 2019.

Summary of Invention

Technical Problem

In a high-frequency-band RoF system, beamforming according to an array antenna is required to enlarge an area that can be covered by radio waves transmitted and received by an extension station. As representative beamforming for securing a budget, there is a method in which the phases of signals transmitted and received from each array antenna are adjusted and controlled such that radio waves are strengthened in a desired direction. In an RoF system, it is desirable to apply remote beamforming in which an aggregation station controls beamforming of an extension station from the viewpoint of simplification of the extension station.

As a remote beamforming technique in an RoF system, there is a method described in PTL 1. FIG. 12 shows an example of a configuration of a wireless communication system for executing the method described in PTL 1. This remote beamforming technique is characterized in that a wavelength is assigned to each element at a sufficiently narrow equal interval. Assigning wavelengths to n antenna elements (n is an integer of 2 or more) at intervals of wavelength $\Delta\lambda$ will be considered. In this case, a wavelength $\lambda_i$ corresponding to an i-th antenna element (i=1, 2, ... n) among the n antenna elements is represented by the following formula (1) on the reference of i=1.

[Math. 1]
$$\lambda_i = \lambda_1 + (i-1)\Delta\lambda \quad (1)$$

When $\Delta\lambda$ is sufficiently small, dispersions of wavelengths can be regarded as the same. Therefore, if $\Delta\lambda$ is sufficiently small and wavelength dispersion is negligibly small, a delay (phase rotation amount $\Delta\theta_{i\_ideal}$) during optical fiber transmission at each wavelength with respect to a reference wavelength is represented by the following formula (2).

[Math. 2]
$$\Delta\theta_{i\_ideal} = -(i-1)\Delta\beta \quad (2)$$

$\Delta\beta$ is a phase rotation amount difference between adjacent wavelengths. A phase rotation amount $\Delta\theta_i$ is added to the signal of the i-th antenna element by optical fiber transmission with respect to the reference wavelength. Therefore, the signals radiated from the respective antenna elements have a phase difference of the interval of $\Delta\beta$. As a result, a beam is formed by the phase difference of the interval of $\Delta\beta$.

Therefore, by applying a phase adjustment amount di to a signal corresponding to the i-th antenna element in the aggregation station such that an interval between adjacent wavelengths becomes $\Delta\alpha$, a phase difference between elements is changed and thus a beam direction can be changed. If a wavelength dispersion difference between wavelengths is negligibly small when the phase adjustment amount of the interval of $\Delta\alpha$ has been applied in the aggregation station, the phase $\theta_{i\_ideal}$ of the signal radiated from the i-th antenna element with respect to the reference wavelength is represented by formula (3).

[Math. 3]
$$\theta_{i\_ideal} = (i-1)(\Delta\alpha - \Delta\beta) + \theta_I \quad (3)$$

$\theta_I$ is the initial phase of an RF signal. At this time, a phase difference from the adjacent antenna element (i+1) is represented by the following formula (4).

[Math. 4]

$$\theta_{i-1} - \theta_i = \Delta\alpha - \Delta\beta \qquad (4)$$

In this way, a phase difference between adjacent antenna elements is an equal interval ($\Delta\alpha-\Delta\beta$) between all elements. This means that a beam direction can be controlled by controlling the value of $\alpha_i$ in the aggregation station.

However, the actual dispersion varies depending on the wavelength. Therefore, a phase rotation amount $\Delta\theta_i$ during optical fiber transmission includes an error $\varphi_i$ depending on the wavelength with respect to $(i-1)\Delta\beta$. FIG. 13 is a diagram illustrating this. The actual phase rotation amount $\Delta\theta_i$ including an error is represented by formula (5). Further, the phase $\theta_i$ of the signal radiated from the i-th antenna element is represented by formula (6).

[Math. 5]

$$\Delta\theta_i = -(i-1)\Delta\beta - \phi_i \qquad (5)$$

[Math 6]

$$\theta_i = (i-1)(\Delta\alpha - \Delta\beta) - \phi_i + \theta_l \qquad (6)$$

Therefore, a phase difference between elements also includes a different error for each wavelength. The phase difference between elements is represented by the following formula (7).

[Math. 7]

$$\theta_{i-1} - \theta_i = \Delta\alpha - \Delta\beta - \phi_{i+1} + \phi_i \qquad (7)$$

The influence of dispersion will be further described by taking a generally laid single mode fiber (SMF) as an example. In the case of an SMF, dispersion increases as the wavelength becomes longer. Accordingly, in the case of an SMF, as the wavelength becomes longer, a delay in optical fiber transmission increases. Therefore, $\Delta\theta_{i+1} > \Delta\theta_i$ and $\varphi_{i+1} > \varphi_i$.

When a wavelength interval is narrow and the number of elements is small, disruption of the equal interval due to the error $\varphi_i$ is insignificant, and thus the influence on beamforming is small. However, when the wavelength band is widen and a dispersion difference increases for widening the wavelength interval or increasing the number of elements, the error Qi becomes large and the equal interval of phase differences of signals radiated from the elements is lost, and thus a beam may collapse. If the beam collapses, a peak gain at the time of beamforming deteriorates, and even if the number of elements is increased, a desired gain may not be obtained.

The collapse of a beam means that coherency of signals transmitted and received by respective antenna elements deteriorates. Hereinafter, deterioration of coherency of signals transmitted and received by respective antenna elements will be referred to as beam collapse.

As a method for solving this problem, it is conceivable to apply a dispersion compensation technique to eliminate a phase rotation amount difference due to dispersion of optical fibers which causes beam collapse. In general, a method using a dispersion compensating fiber (DCF) and a method using a chirped fiber Bragg grating (CFBG) method are widely known as a dispersion compensating method for optical fibers.

The DCF method is a method for making the transmission speed of each wavelength from an input end to an output end constant by inserting a DCF module having a dispersion characteristic opposite to that of an optical fiber used for transmission. Since the transmission speed becomes constant, phase rotation during optical fiber transmission also becomes constant. Therefore, if the DCF type dispersion compensation technique is used, it is possible to curb beam collapse in the remote beamforming technique.

However, since a DCF module has a relatively large insertion loss, the advantage of the optical fiber that transmission loss is small is impaired. Further, there is a problem that optical fiber length information is required to perform dispersion compensation with high accuracy, and it is difficult to apply the method to the remote beamforming technique in the RoF system.

The CFBG method is a method for making a transmission time constant by causing Bragg reflection in an optical fiber to cause a propagation time difference due to reflection. Accordingly, phase rotation during optical fiber transmission at each wavelength becomes constant. Therefore, if the CFBG type dispersion compensation technique is used, beam collapse in the remote beam forming technique can be curbed. However, this method has a problem that only light near a wavelength satisfying the Bragg condition is reflected and thus a wavelength range that can be compensated is narrow, and it is difficult to apply the method to the remote beamforming technique in the RoF system.

In view of the above circumstances, an object of the present invention is to provide a technique for reducing beam collapse caused by a phase rotation amount difference for each wavelength occurring during optical fiber transmission.

Solution to Problem

An aspect of the present invention is a wireless communication system including an accommodation station device and a base station device connected to the accommodation station device through an optical transmission path and having n (n is an integer of 2 or more) antenna elements, wherein a plurality of optical signals having different wavelengths propagate through the optical transmission path, the wireless communication system including a prior information acquisition unit configured to execute prior information acquisition processing for acquiring, as prior information, dispersion phase difference information that is information including a dispersion phase difference that is a phase rotation amount difference generated between adjacent optical signals on a wavelength axis due to propagation of the optical signals through the optical transmission path, and a compensation phase shift unit configured to execute compensation phase shift processing for reducing a difference from a phase difference reference that is a predetermined reference on the basis of the prior information with respect to the phase rotation amount difference generated between adjacent optical signals on the wavelength axis caused by wavelength dispersion in the optical transmission line.

An aspect of the present invention is a wireless communication method executed by a wireless communication system including an accommodation station device and a base station device connected to the accommodation station device through an optical transmission path and having n (n is an integer of 2 or more) antenna elements, wherein a plurality of optical signals having different wavelengths propagate through the optical transmission path, the wireless communication method including a prior information acquisition step of executing prior information acquisition processing for acquiring, as prior information, dispersion phase difference information that is information including a dispersion phase difference that is a phase rotation amount difference generated between adjacent optical signals on a wavelength axis due to propagation of the optical signals through the optical transmission path, and a compensation phase shift step of executing compensation phase shift processing for reducing a difference from a phase difference reference that is a predetermined reference on the basis of the prior information with respect to the phase rotation amount difference generated between adjacent optical signals on the wavelength axis caused by wavelength dispersion in the optical transmission line.

Advantageous Effects of Invention

According to the present invention, it is possible to reduce beam collapse caused by a phase rotation amount difference for each wavelength occurring during optical fiber transmission.

BRIEF DESCRIPTION OF DRAWINGS

FIG. 3 is a diagram showing an example of results of pre-beamforming processing in the embodiment.

FIG. 11 is an explanatory diagram illustrating an example of a pre-beamforming processing in a modified example.

DESCRIPTION OF EMBODIMENTS

Embodiment

Figure 1:
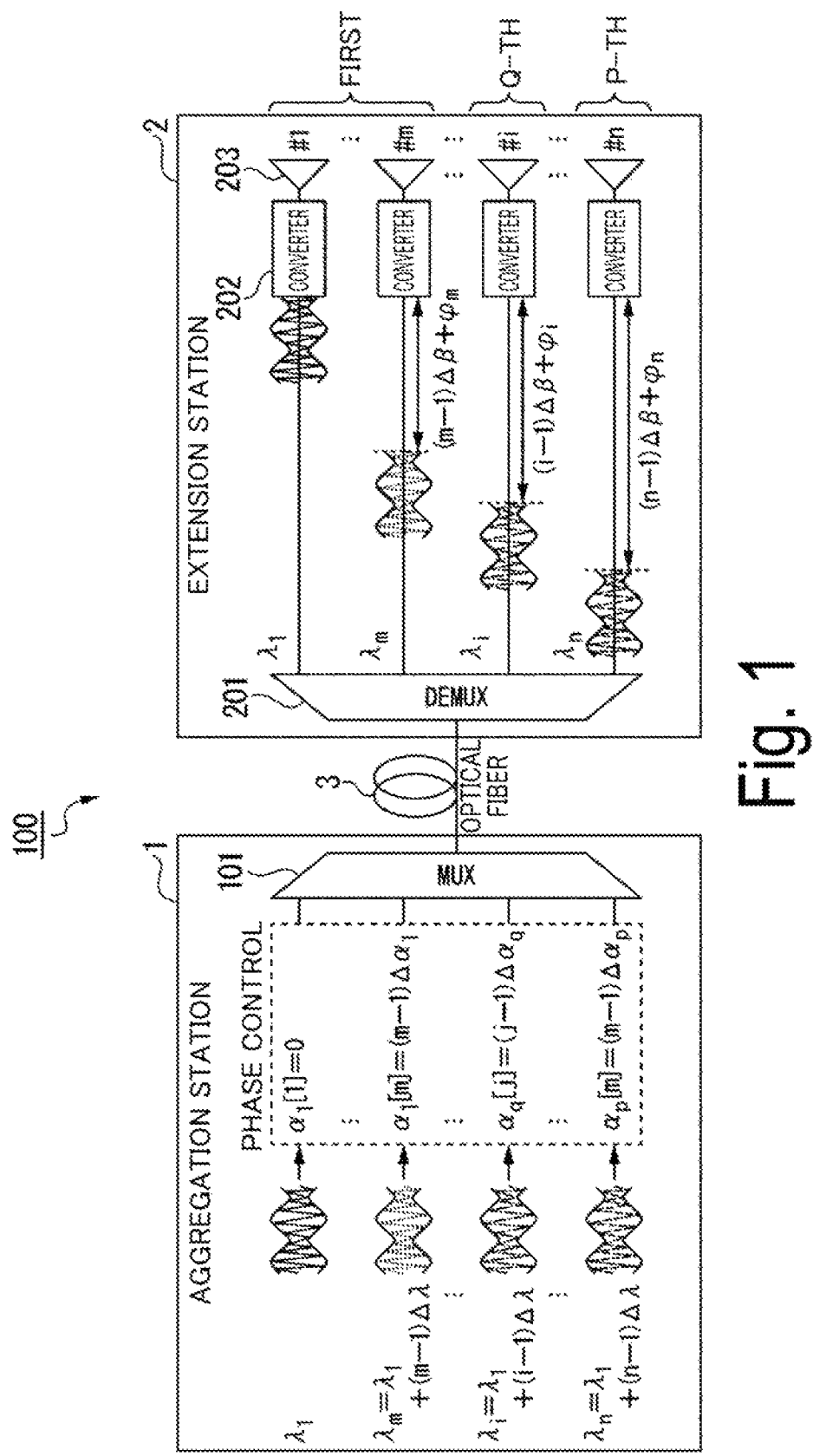
FIG. 1 is an explanatory diagram illustrating an overview of a wireless communication system 100 of an embodiment.

FIG. 1 is an explanatory diagram illustrating an overview of a wireless communication system 100 of an embodiment.

The wireless communication system 100 includes an aggregation station 1 and an extension station 2. The wireless communication system 100 is, for example, a radio over fiber (RoF) system. The wireless communication system 100 includes antenna elements as will be described later. In general, transmission and reception of electromagnetic waves by an antenna element have time-reversal symmetry. Therefore, time reversal of a phenomenon of reception by an antenna element is a phenomenon of transmission. This also applies to the antenna elements included in the wireless communication system 100. Hereinafter, for simplicity of description, an example of a case in which the wireless communication system 100 radiates electromagnetic waves will be described.

The aggregation station 1 processes a plurality of electrical signals respectively corresponding to antenna elements 203 included in the extension station 2. In the aggregation station 1, a plurality of optical signals corresponding to the antenna elements 203 are propagated. Signals corresponding to the antenna elements 203 (hereinafter referred to as "electromagnetic signals") mean signals propagating between the antenna elements 203 and the aggregation station.

An electromagnetic signal may propagate in the wireless communication system 100 in the state of an optical signal or may be in the state of an electrical signal. When an optical signal has been converted into an electrical signal by photoelectric conversion, both of the optical signal before conversion and the electrical signal after conversion are the same as electromagnetic signals. Further, in a case where an electrical signal is converted into an optical signal by electro-optical conversion, both the electrical signal before conversion and the optical signal after conversion are the same as electromagnetic signals.

In the aggregation station 1, a plurality of optical signals are multiplexed and output to an optical fiber 3. The aggregation station 1 controls the phases of the optical signals or electrical signals before multiplexing the plurality of optical signals. Hereinafter, an optical signal in a non-multiplexed state will be referred to as an elementary optical signal. Hereinafter, an electrical signal in a non-multiplexed state is referred to as an elementary electrical signal. Hereinafter, an optical signal in a multiplexed state is referred to as a multiplexed optical signal.

Electrical signals are converted into optical signals (i.e., elementary optical signals) having different wavelengths by an electrical/optical (E/O) converter. The aggregation station 1 controls the phases of elementary electrical signals. The aggregation station 1 may control the phases of the elementary optical signals.

The aggregation station 1 generates a multiplexed optical signal obtained by multiplexing the plurality of elementary optical signals after phase control. The aggregation station 1 multiplexes the optical signals by, for example, a multiplexer (MUX) 101 shown in FIG. 1. The aggregation station 1 outputs the generated multiplexed optical signal to the optical fiber 3.

The optical fiber 3 transmits the multiplexed optical signal output by the aggregation station 1 to the extension station 2.

The extension station 2 receives the multiplexed optical signal transmitted through the optical fiber 3. The extension station 2 demultiplexes the received multiplexed optical signal for each wavelength. Hereinafter, each of a plurality of optical signals having different wavelengths is referred to as an elementary optical signal. That is, multiplexing of elementary optical signals is a multiplexed optical signal.

Demultiplexing is performed by, for example, a demultiplexer (DEMUX) 201 shown in FIG. 1. The extension station 2 converts the elementary optical signals into electric signals for each wavelength by a converter 202. That is, the converter 202 shown in FIG. 1 converts the elementary optical signals into elementary electric signals. The elementary electrical signal output from the converter 202 is propagated to the antenna elements 203. The antenna elements 203 radiate the elementary electrical signals as radio waves.

In this manner, the wireless communication system 100 transmits the radio waves to a communication destination. For example, the communication destination is another wireless communication system 100. The wireless communication system 100 may receive radio waves transmitted from the communication destination through the antenna elements 203.

The radio waves received by the antenna elements 203 propagate through a path in the wireless communication system 100 in a direction opposite to that at the time of transmission when the wireless communication system 100 transmits the radio waves. That is, the radio waves received by the antenna elements 203 are propagated from the antenna elements 203 to the converter 202 in the extension station 2, are converted from the radio waves into optical signals by the converter 202, and then propagate through the optical fiber 3 to reach the aggregation station 1. In the example shown in FIG. 1, the extension station 2 includes n antenna elements 203. n is an integer of 2 or more.

Generally, an optical fiber has wavelength dispersion. Therefore, the amount of phase rotation generated in each elementary optical signal due to propagation of the optical fiber 3 differs for each wavelength, that is, for each elementary optical signal corresponding to each antenna element. The wireless communication system 100 reduces a difference from a predetermined reference (hereinafter referred to as a "phase difference reference") using prior information with respect to a difference in phase rotation between elementary optical signals caused by such wavelength dispersion of the optical fiber 3.

The prior information used by the wireless communication system 100 is information indicating a phase rotation amount including a dispersion phase difference (hereinafter referred to as "dispersion phase difference information") The dispersion phase difference is a difference in the amount of phase rotation generated between adjacent elementary optical signals due to propagation of the elementary optical signals through the optical fiber 3. The wireless communication system 100 obtains the prior information by executing, for example, pre-beamforming processing which will be described later. Processing for reducing a difference from the predetermined reference with respect to a dispersion phase difference is specifically compensation phase shift processing below.

The compensation phase shift processing is processing for rotating the phase of each elementary electric signal in advance at the time of phase control in an aggregation station on the basis of a dispersion phase difference indicated by the prior information such that the difference between the dispersion phase difference indicated by the prior information and the phase difference reference is reduced. The phase of each elementary electrical signal is rotated by the aggregation station 1. Specifically, the aggregation station 1 rotates the phase of each elementary electrical signal according to phase control.

$\lambda_i$ shown in FIG. 1 represents a wavelength. i (i is an integer of 1 or more and n or less) is an identifier for identifying the antenna element 203. Therefore, $\lambda_i$ represents a wavelength when a signal transmitted and received by the i-th antenna element 203 is in a state of an optical signal. Hereinafter, a signal transmitted and received by the i-th antenna element 203 is referred to as an i-th electromagnetic signal. Hereinafter, the symbol i is used as a symbol indicating that it is a physical quantity with respect to the i-th electromagnetic signal. Further, hereinafter, the symbol i is used to distinguish a functional unit to/from which the i-th electromagnetic signal is input/output from a functional unit to/from which another electromagnetic signal is input/output. That is, the function unit having the symbol "i" is a function unit to/from which the i-th electromagnetic signal is input/output.

FIG. 1 shows that the wavelength of $\Delta_i$ is $(\Delta_1+(i-1)\Delta\lambda)$. The interval $\Delta\alpha$ of phase adjustment amounts represents a phase difference between adjacent wavelengths applied to each elementary electrical signal at the time of phase control in the aggregation station. $\Delta\alpha_q$ shown in in FIG. 1 means an interval of phase adjustment amounts at the time of executing the q-th pre-beamforming (which will be described in detail later). Therefore, q is an identifier indicating the number of times of trial of pre-beamforming. The interval of phase adjustment amounts means a phase difference between adjacent wavelengths. Hereinafter, when intervals $\Delta\alpha_1, \Delta\alpha_2, \ldots, \Delta\alpha_q$ of phase shift adjustment amounts are not distinguished, the intervals are referred to as an interval $\Delta\alpha$ of phase shift adjustment amounts. That is, when differences in execution timing of pre-beamforming are not distinguished, any of intervals $\Delta\alpha_1, \Delta\alpha_2, \ldots, \Delta\alpha_q, \ldots$ is referred to as the interval $\Delta\alpha$ of phase shift adjustment amounts.

FIG. 1 shows that a phase difference $\Delta\alpha_q$ is given between an elementary electrical signal with $\lambda_{(i-1)}$ and an elementary electrical signal with $\lambda_i$ according to phase control in the q-th pre-beamforming. The difference $\Delta\beta$ between phase rotation amounts which are amounts of phase rotation shown in FIG. 1 is a difference between phase rotation amounts generated between adjacent elementary optical signals on the wavelength axis when the elementary optical signals propagate through the optical fiber 3, and is represented by the product of a time difference between adjacent wavelengths during propagation through the optical fiber 3 and an angular frequency when dispersion of each wavelength is regarded as constant. When wavelengths are assigned at equal intervals $\Delta\lambda$, differences in optical fiber propagation time between adjacent wavelengths are substantially the same. Therefore, differences in phase rotation amount are also substantially the same. However, a slight difference occurs due to a difference in dispersion for each wavelength. A phase difference caused by this is a dispersion phase difference $\varphi_i$.

Meanwhile, $\alpha_q[j]$ represents a phase adjustment amount of a j-th electromagnetic signal during execution of the q-th pre-beamforming. The symbol $Z_i$ used in description of the subsequent stage represents a phase adjustment amount of the i-th electromagnetic signal when beamforming is performed for all of the first to n-th electromagnetic signals after pre-beamforming is completed a predetermined number of times.

<Overview of Pre-Beamforming Process>

The wireless communication system 100 executes pre-beamforming processing with a communication partner. The communication partner is, for example, a wireless terminal. Pre-beamforming processing is processing for executing unit preprocessing for all antenna element sets. The unit preprocessing is processing for determining a phase adjustment amount interval Δα for forming an optimum beam according to communication with a wireless terminal that is a communication destination. Therefore, the pre-beamforming processing is processing for acquiring prior information according to communication with the communication destination.

An antenna element set is a set of a plurality of predetermined antenna elements 203. More specifically, in the pre-beamforming processing, beam sweeping is performed according to the procedure of the remote beamforming technique described in PTL 1. Beam sweeping is to form a beam while scanning the phase adjustment amount interval Δα in a predetermined arbitrary range and particle size. Subsequently, processing for receiving feedback from the communication destination (hereinafter referred to as "feedback acquisition processing") is executed in the pre-beamforming processing.

Next, processing for acquiring the phase adjustment amount interval Δα forming an optimum beam (hereinafter referred to as "optimum condition acquisition processing") is executed on the basis of the received feedback in the pre-beamforming processing. The pre-beamforming processing is repeatedly executed while changing combinations of the antenna elements 203 until beam sweeping, feedback acquisition processing, and optimum condition acquisition processing are executed for all the antenna elements 203. The optimum beam is a beam having beam collapse smaller than a predetermined reference value. Beam collapse means that the coherency of signals forming a beam deteriorates.

The pre-beamforming processing is processing for acquiring a phase difference between antenna elements 203 so as not to cause beam collapse. Therefore, combinations of the antenna elements 203 used for the pre-beamforming processing are predetermined such that phase differences between all the antenna elements 203 can be obtained.

<Details of Pre-Beamforming Processing>

The details of the pre-beamforming processing will be described. The pre-beamforming processing is executed such that conditions predetermined for the pre-beamforming processing (hereinafter referred to as "pre-beamforming execution conditions") are satisfied.

The pre-beamforming execution conditions include a condition that the number of antenna elements 203 used in the unit preprocessing is m (m is n or less) (hereinafter referred to as a "first antenna element condition").

The pre-beamforming execution conditions include a condition that the number p of trials satisfies the following formula (8) (hereinafter referred to as a "trial number condition"). The number of trials is the number of times of executing the unit preprocessing. That is, the number of trials is the number of antenna element sets. Accordingly, p is an integer of 1 or more.

[Math. 8]

$$p = \text{ceil}\left(\frac{n-1}{m-1}\right) \quad (8)$$

The value of a ceil function of an independent variable x is a minimum integer among integers equal to or greater than the independent variable x.

The pre-beamforming execution conditions include a condition that an antenna element 203-$i$ satisfying the following formula (9) is used in the q-th unit preprocessing (q is an integer of 1 or more and p or less) (hereinafter referred to as a "second antenna element condition"). The antenna element 203-$i$ means an antenna element 203 to which the elementary electric signal corresponding to the wavelength $\lambda_i$ propagates. That is, the antenna element 203-$i$ is an antenna element 203 which radiates the elementary electrical signal corresponding to the wavelength $\lambda_i$ as radio waves.

[Math. 9]

$$i = j + (q-1)(m-1) \quad (9)$$

j is an integer of 1 or more and m or less. j is an identifier for distinguishing each of m antenna elements 203 used in the pre-beamforming processing.

The pre-beamforming execution conditions include a condition that one or more antenna elements 203 used in unit preprocessing one time before are included in the second and subsequent unit preprocessing (hereinafter referred to as a "third antenna element condition"). Since the pre-beamforming execution conditions include the third antenna element condition, the prior information acquisition unit 121 can acquire a difference in phase rotation amounts between wavelengths (that is, between antenna elements 203) generated due to propagation of an optical signal through the optical fiber 3.

The pre-beamforming execution conditions include may include a condition that an antenna element 203 adjacent to the antenna element 203 used in unit preprocessing one time before is included when the number of antenna elements satisfying formula (9) is less than m in the second and subsequent unit preprocessing (hereinafter referred to as a "fourth antenna element condition").

In each type of unit preprocessing, beam sweeping is executed while phase adjustment amounts are scanned as described in PTL 1. As a result of beam sweeping, an interval Δα for forming an optimum beam is acquired by feedback from a wireless terminal that is a communication destination in each type of unit preprocessing. The interval Δα obtained through each type of unit preprocessing is recorded in a storage unit 14, which will be described later, by a recording control unit 130, which will be described later.

In the pre-beamforming processing, a phase adjustment amount $z_i$ for each antenna element 203 during beamforming using n antenna elements 203 is calculated using the interval Δα obtained in each type of unit preprocessing.

A phase adjustment amount for the antenna element 203-$i$ is represented by the following formula (10).

[Math. 10]

$$z_i = (j-1)\Delta\alpha_q + \sum_k^{q-1}(m-1)\Delta\alpha_k \quad (10)$$

$\Delta\alpha_k$ represents an interval Δα obtained through the k-th unit preprocessing (k is an integer of 1 or more). The phase adjustment amount $z_i$ obtained in this manner includes an approximate average value of differences (that is, $\psi_{i+1}-\psi_i$) in dispersion phase differences between wavelengths used in the pre-beamforming processing. Therefore, when pre-beamforming is executed by using antenna elements 203 to which relatively short wavelengths are allocated among all the antenna elements 203, the approximate average value of $\psi_{i+1}-\psi_i$ decreases, and thus the value of an interval $\Delta\alpha_q$ decreases. Therefore, the value of $\Delta\alpha_q$ when the pre-beamforming processing is executed using antenna elements 203 to which relatively long wavelengths are allocated increases.

In this manner, the interval $\Delta\alpha_q$ of phase adjustment amounts including differences $\psi_{i+1}-\psi_i$ in dispersion phase differences depending on wavelengths is obtained according to the pre-beamforming processing. Therefore, the phase adjustment amount $z_i$ obtained according to formula (10) using the obtained interval $\Delta\alpha_q$ is a value reflecting a difference in dispersion phase differences from adjacent wavelengths depending on wavelengths. Therefore, the wireless communication system 100 for obtaining priori information by executing the pre-beamforming processing can reduce beam collapse due to a phase error by offsetting $\psi_i$ included in the phase rotation amount $\Delta\theta_i$ during optical fiber transmission. The phase rotation amount $\Delta\theta_i$ is a phase difference of $\lambda_i$ generated due to optical fiber transmission with respect to the reference wavelength.

Figure 2:
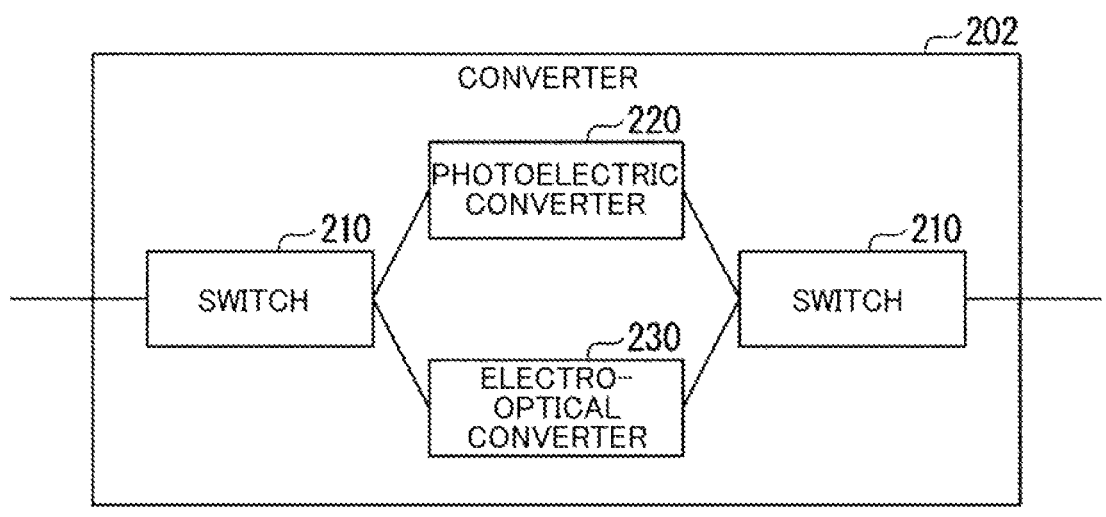
FIG. 2 is a diagram showing an example of a configuration of a converter 202 in the embodiment.

FIG. 2 is a diagram showing an example of a configuration of the converter 202 in the embodiment. The converter 202 includes two switches 210, a photoelectric converter 220, and an electro-optical converter 230. The switch 210 switches a propagation destination of an input signal to either the photoelectric converter 220 or the electro-optical converter 230. The photoelectric converter 220 is an EO converter. The electro-optical converter 230 is an OE converter. The signal input to the converter 202 passes through the switch 210 and propagates to the electro-optical converter 230 when it is an electrical signal. The signal input to the converter 202 passes through the switch 210 and propagates to the photoelectric converter 220 when it is an optical signal.

FIG. 3 is a diagram showing an example of results of pre-beamforming processing in the embodiment. More specifically, FIG. 3 is a diagram showing an example of results of pre-beamforming processing when n=10 and m=4. Since n=10 and m=4, the number p of trials is 3 according to formula (8). Further, four antenna elements 203-1 to 203-4 are used for the first unit preprocessing according to formula (9) since n=10 and m=4. Further, four antenna elements 203-4 to 203-7 are used for the second unit preprocessing according to formula (9) since n=10 and m=4. Further, four antenna elements 203-7 to 203-10 are used for the third unit preprocessing according to formula (9) since n=10 and m=4.

FIG. 3 shows that the interval $\Delta\alpha$ for forming an optimum beam obtained through the first unit preprocessing is $\Delta\alpha_1$. FIG. 3 shows that the interval $\Delta\alpha$ for forming an optimum beam obtained through the second unit preprocessing is $\Delta\alpha_2$. FIG. 3 shows that the interval $\Delta\alpha$ for forming an optimum beam obtained through the third unit preprocessing is $\Delta\alpha_3$. In the example of FIG. 3, $\Delta\alpha_1$, $\Delta\alpha_2$ and $\Delta\alpha_3$ satisfy the relationship of $\Delta\alpha_1<\Delta\alpha2<\Delta\alpha3$.

"Pre-BF" in FIG. 3 means unit preprocessing. "Amount of phase rotation from reference wavelength (i=1) in optical fiber" in FIG. 3 is the phase difference of $\lambda_i$ calculated by formula (5), which means a phase difference generated due to optical fiber transmission with respect to the reference wavelength "During BF of all elements" in FIG. 3 means beamforming using n antenna elements 203.

FIG. 3 shows that phase adjustment amounts $\alpha_i[j]$ obtained in the first unit preprocessing are 0, $\Delta\alpha_1$, $2\Delta\alpha_1$, and $3\Delta\alpha_1$ because the interval $\Delta\alpha$ for forming an optimum beam obtained in the first unit preprocessing is $\Delta\alpha_1$. FIG. 3 shows that phase adjustment amounts $\alpha_2[j]$ obtained in the second unit preprocessing are 0, $\Delta\alpha_2$, $2\Delta\alpha_2$, and $3\Delta\alpha_2$ because the interval $\Delta\alpha$ for forming an optimum beam obtained in the second unit preprocessing is $\Delta\alpha_2$. FIG. 3 shows that phase adjustment amounts $\alpha_3[j]$ obtained in the third unit preprocessing are 0, $\Delta\alpha_3$, $2\Delta\alpha_3$, and $3\Delta\alpha_3$ because the interval $\Delta\alpha$ for forming an optimum beam obtained in the third unit preprocessing is $\Delta\alpha_3$.

FIG. 3 shows phase adjustment amounts $z_i$ obtained on the basis of formula (10) and the interval $\Delta\alpha_q$.

Figure 4:
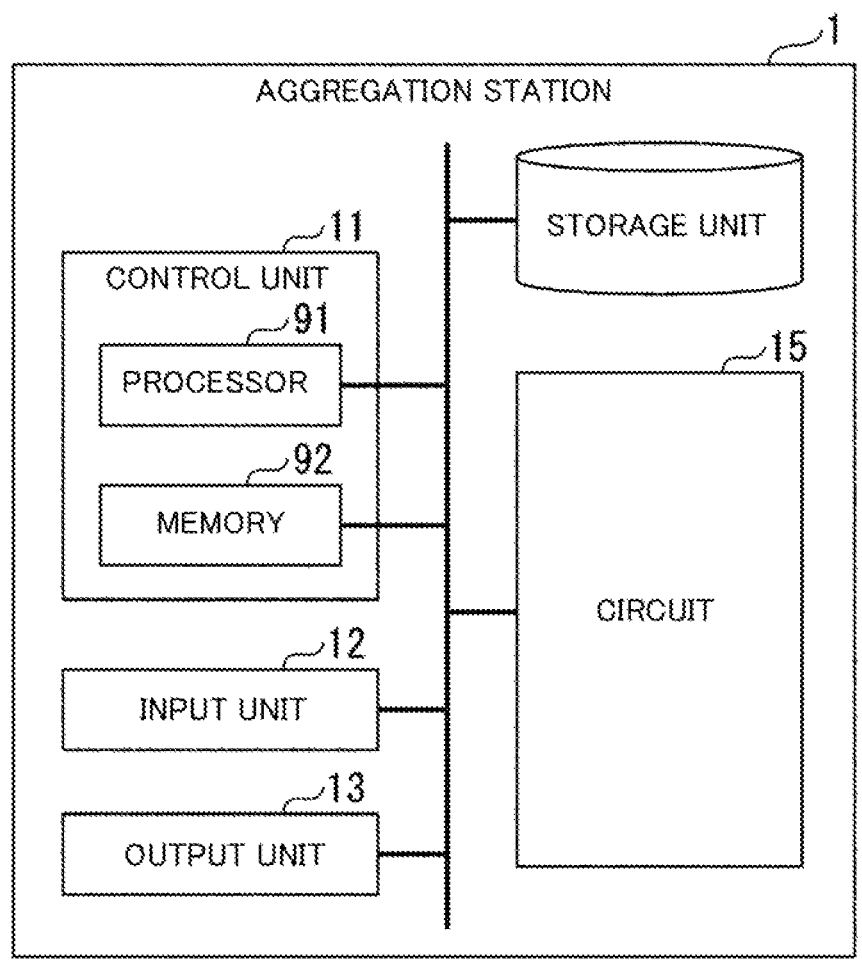
FIG. 4 is a diagram showing an example of a hardware configuration of an aggregation station 1 in the embodiment.

FIG. 4 is a diagram showing an example of a hardware configuration of the aggregation station 1 in the embodiment. The aggregation station 1 includes a control unit 11 having a processor 91 such as a CPU and a memory 92 that are connected via a bus, and executes a program. The aggregation station 1 serves as a device that includes the control unit 11, an input unit 12, an output unit 13, a storage unit 14, and a circuit 15 by executing the program.

More specifically, the processor 91 reads the program stored in the storage unit 14 and stores the read program in the memory 92. The aggregation station 1 serves as the device including the control unit 11, the input unit 12, the output unit 13, the storage unit 14, and the circuit 15 by the processor 91 executing the program stored in the memory 92.

The control unit 11 controls operations of various functional units included in the aggregation station 1. The control unit 11 controls, for example, the operation of the input unit 12. The control unit 11 controls, for example, the operation of the output unit 13. The control unit 11 controls, for example, the operation of the circuit 15. The control unit 11 records, for example, various types of information generated according to control of the operation of the circuit 15 in the storage unit 14.

The input unit 12 includes an input device such as a mouse, a keyboard, and a touch panel. The input unit 12 may be configured as an interface for connecting these input devices to the aggregation station 1. The input unit 12 receives input of various types of information to the aggregation station 1. For example, information for instructing start of communication (hereinafter referred to as a "communication start instruction") is input to the input unit 12. For example, information for carrying radio waves radiated by the extension station 2 using antenna elements 203 (hereinafter referred to as "carrying content information") may be input to the input unit 12. For example, information indicating a propagation direction of radio waves radiated from the extension station 2 (hereinafter referred to as "radiation direction information") may be input to the input unit 12.

It is not always necessary to input the carrying content information and the radiation direction information through the input unit 12. The carrying content information may be, for example, information stored in the storage unit 14 in advance and may indicate predetermined content. The radiation direction information may be, for example, stored in the storage unit 14 in advance, and the indicated propagation direction may be a predetermined propagation direction.

The output unit 13 outputs various types of information. The output unit 13 includes a display device such as a cathode ray tube (CRT) display, a liquid crystal display, or an organic electro-luminescence (EL) display, for example. The output unit 13 may be configured as an interface for connecting such a display device to the aggregation station 1. The output unit 13 outputs information that is input to the input unit 12, for example.

The storage unit 14 is configured by using a non-transitory computer-readable storage medium device such as a magnetic hard disk device or a semiconductor storage device. The storage unit 14 stores various types of information about the aggregation station 1. The storage unit 14 stores, for example, information input via the input unit 12.

The circuit 15 is a circuit for performing downstream transmission and upstream transmission. Therefore, the circuit 15 includes two kinds of circuits, a circuit used during downstream transmission (hereinafter referred to as a "downstream circuit") and a circuit used for upstream transmission (hereinafter referred to as an "upstream circuit").

Figure 5:
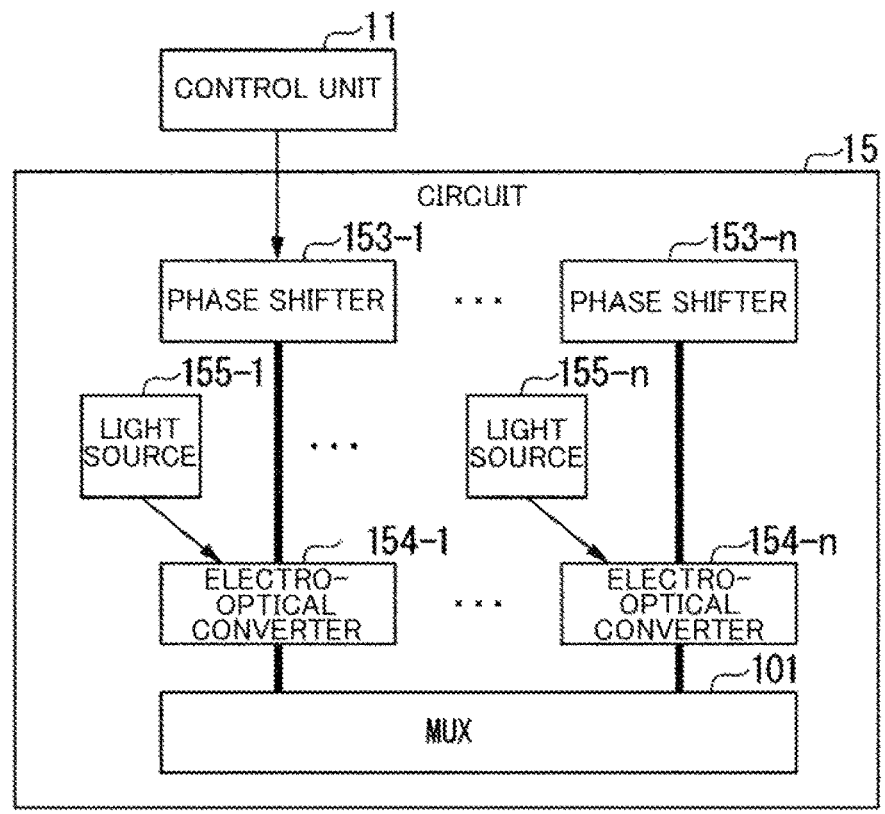
FIG. 5 is an explanatory diagram illustrating a downstream circuit included in a circuit 15 in the embodiment.

FIG. 5 is an explanatory diagram illustrating a downstream circuit included in the circuit 15 in the embodiment. The downstream circuit is a circuit including n phase shifters 153-1 to 153-$n$, n electro-optical converters 154-1 to 154-$n$, n light sources 155-1 to 155-$n$, and a MUX 101.

A light source 155-$i$ generates light having a wavelength $\lambda_i$. The phase shifters 153-1 to 153-$n$ change the phase of an electromagnetic signal. For example, a phase shifter 153-$i$ changes the phase of an electromagnetic wave signal corresponding to the i-th antenna element. As a result of phase change by the phase shifter 153-$i$, a phase difference is generated between adjacent elementary signals.

Each of the electro-optical converters 154-$i$ has the same configuration as that of the electro-optical converter 230 shown in FIG. 2. At the time of downstream transmission, the electro-optical converters 154-$i$ convert elementary electrical signals into optical signals having different wavelengths by electro-optical conversion. The elementary electrical signals input to the electro-optical converters 154-$i$ are signals generated by the control unit 11. Specifically, modulation by the elementary electrical signals is applied to optical signals generated by the light sources 155-1 to 155-$n$.

Therefore, modulation applied to the optical signals reflects the waveforms of the elementary electrical signals. In this manner, the electro-optical converters 154-$i$ execute processing for modulating the optical signals. This processing corresponds to conversion of elementary electrical signals into optical signals when viewed from the elementary electrical signals. Therefore, the electro-optical converters 154-$i$ are also functional units for converting elementary electrical signals into optical signals.

When the electro-optical converters 154-$i$ are not distinguished from each other, they will be referred to as an electro-optical converter 154. The MUX 101 multiplexes the optical signals having n wavelengths output from the electro-optical converter 154. An optical signal generated by multiplexing by the MUX 101 is a multiplexed optical signal. Further, the MUX 101 outputs the generated multiplexed signal to the optical fiber 3.

The phase shifters 153-$i$ do not necessarily need to be located in the front stage of the electro-optical converters 154-$i$, and may be located between the electro-optical converters 154-$i$ and the MUX 101. That is, phase change may be performed after conversion from an electrical signal into an optical signal. Phase change after conversion from an electrical signal into an optical signal is performed, for example, by the phase shifters 153-$i$ operating as optical phase shifters.

Figure 6:
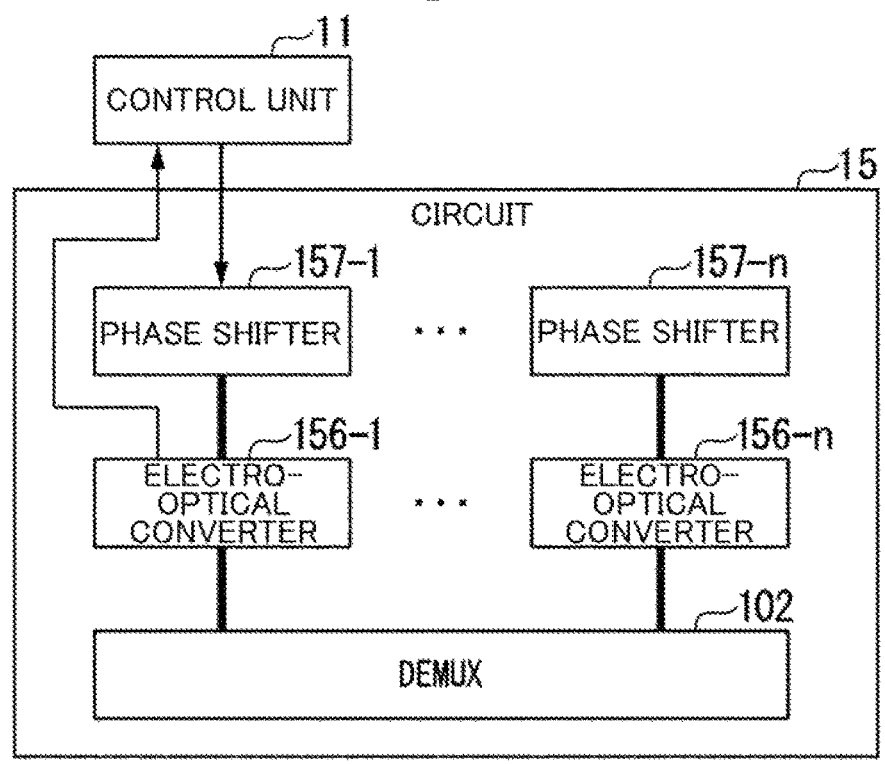
FIG. 6 is an explanatory diagram illustrating an upstream circuit included in the circuit 15 in the embodiment.

FIG. 6 is an explanatory diagram illustrating an upstream circuit included in the circuit 15 in the embodiment. The upstream circuit is a circuit including n phase shifters 157-1 to 157-$n$, n photoelectric converters 156-1 to 156-$n$, and a DEMUX 102.

A phase shifter 157-$i$ changes the phase of an electromagnetic signal. For example, the phase shifter 157-$i$ changes the phase of an i-th electromagnetic signal input thereto. Each photoelectric converter 156-$i$ has the same configuration as that of the photoelectric converter 220 shown in FIG. 2.

At the time of upstream transmission, an optical signal is incident on the DEMUX 102 from the optical fiber 3. The DEMUX 102 demultiplexes incident light into n elementary optical signals having wavelengths $\lambda_1$ to $\lambda_n$. The optical signal having the wavelength $\lambda_i$ is incident on the photoelectric converter 156-$i$. The incident optical signal having the wavelength $\lambda_i$ is converted into an electrical signal in the photoelectric converter 156-$i$. The converted electrical signal is input to the phase shifter 157-$i$, and the phase thereof is changed by the phase shifter 157-$i$. The phase-changed electrical signal is output to the control unit 11.

Figure 7:
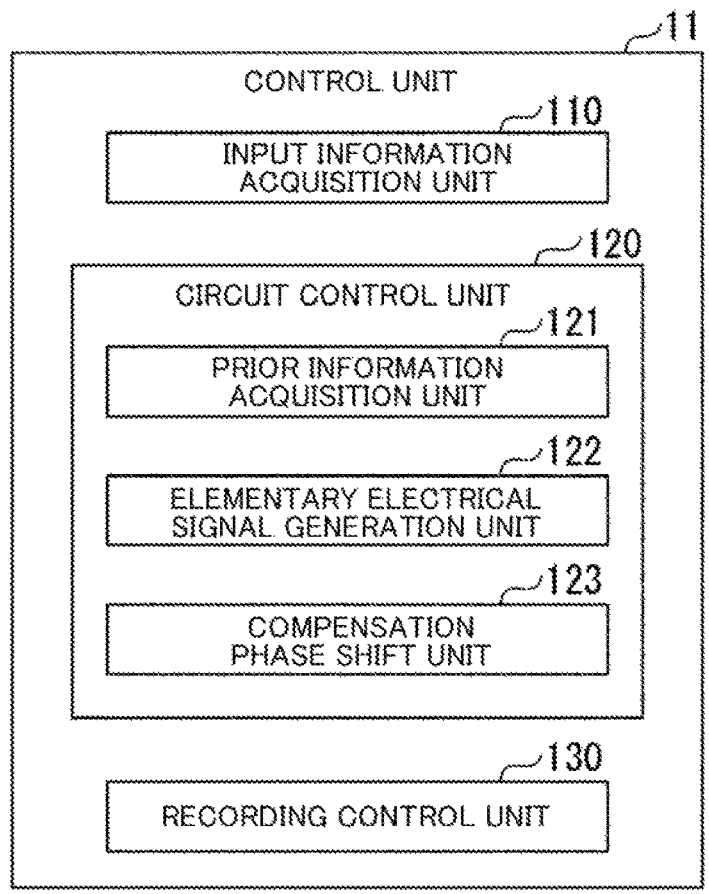
FIG. 7 is a diagram showing an example of a functional configuration of a control unit 11 in the embodiment.

FIG. 7 is a diagram illustrating an example of a functional configuration of the control unit 11 in an embodiment. The control unit 11 includes an input information acquisition unit 110, a circuit control unit 120, and a recording control unit 130. The input information acquisition unit 110 acquires information input to the input unit 12. The input information acquisition unit 110 may read carrying content information from the storage unit 14 when the carrying content information has been stored in the storage unit 14 in advance. The input information acquisition unit 110 may read radiation direction information from the storage unit 14 when the radiation direction information has been stored in the storage unit 14 in advance.

The circuit control unit 120 controls the operation of the circuit 15. The circuit control unit 120 controls the operation of the circuit 15 to execute processing for acquiring dispersion phase difference information as prior information (hereinafter referred to as "prior information acquisition processing"). Processing for acquiring prior information is, for example, pre-beamforming processing.

The circuit control unit 120 executes compensation phase shift processing on the basis of the acquired prior information. Specifically, the compensation phase shift processing is processing for controlling the operations of the phase shifters 153-1 to 153-$n$ such that the circuit control unit 120 rotates the phase of each elementary electrical signal by an amount based on the prior information. More specifically, the compensation phase shift processing is processing for setting parameters of respective elements of the phase shifters 153-1 to 153-$n$ such that the circuit control unit 120 rotates the phase of each elementary electric signal by the amount based on the prior information.

The circuit control unit 120 includes a prior information acquisition unit 121, an elementary electrical signal generation unit 122, and a compensation phase shift unit 123. The prior information acquisition unit 121 executes prior information acquisition processing. The elementary electrical signal generation unit 122 generates an elementary electrical signal. The elementary electrical signal generation unit 122 generates an elementary electrical signal representing carrying content information input to the input unit 12. The compensation phase shift unit 123 performs compensation phase shift processing. The compensation phase shift unit 123 controls the operation of the circuit 15 such that electromagnetic signal generation conditions are satisfied on the basis of the prior information acquired by the prior information acquisition unit 121. The electromagnetic signal generation conditions include a condition that an optimum beam is formed when a generated electromagnetic signal is radiated as radio waves from an antenna element 203. Specifically, the operation of the circuit 15 according to the compensation phase shift unit 123 is control of the operations of phase shifters 153-1 to 153-$n$ or 157-1 to 157-$n$.

The recording control unit 130 records various types of information generated or obtained by the operation of the control unit 11, such as prior information obtained through prior information acquisition processing and information obtained by the input information acquisition unit 110, in the storage unit 14.

Figure 8:
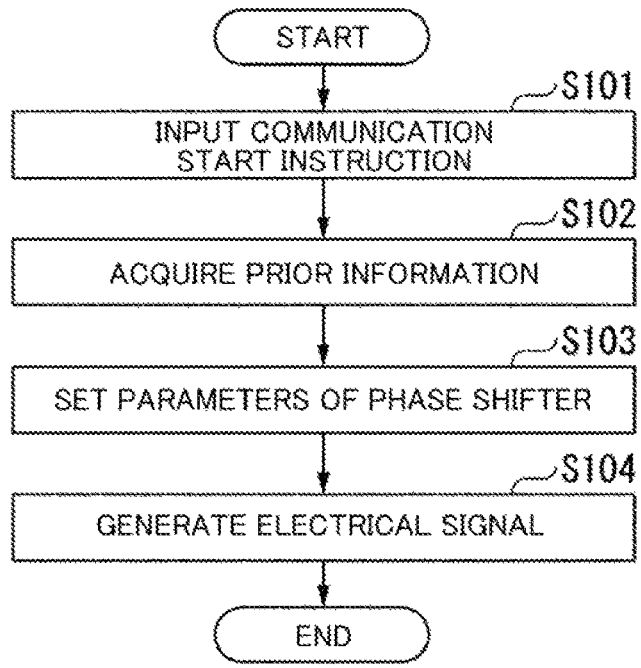
FIG. 8 is a flowchart showing an example of a flow of processing executed by the aggregation station 1 in the embodiment.

FIG. 8 is a flowchart showing an example of a flow of processing executed by the aggregation station 1 in an embodiment.

A communication start instruction is input to the input unit 12, and the input information acquisition unit 110 acquires the communication start instruction and carrying content information (step S101). The prior information acquisition unit 121 controls the operation of the circuit 15 by executing prior information acquisition processing to acquire prior information (step S102). Next, the compensation phase shift unit 123 executes compensation phase shift processing (step S103). Next, the elementary electrical signal generation unit 122 controls the operation of the circuit 15 to generate an elementary electrical signal (step S104). By executing processing of step S104, the signal propagates to the antenna elements 203 and is radiated as radio waves. Radio waves radiated from each antenna element 203 form a beam carrying the carrying content information according to interference. The beam propagates toward a communication destination.

It is not always necessary to execute processing of step S102 and step S103 every time after processing of step S101. Processing of step S102 and step S103 may be executed only at a predetermined timing.

Figures 9, 10:
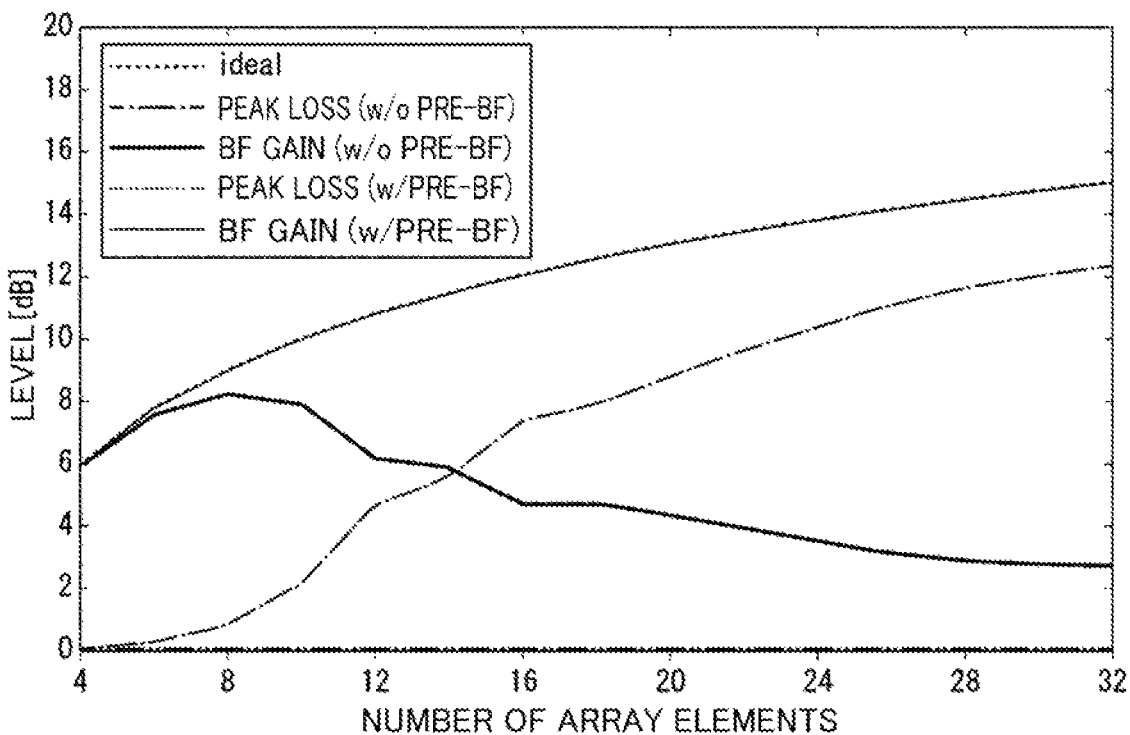
FIG. 9 is an explanatory diagram illustrating an example of a simulation result of evaluation of characteristics of the wireless communication system 100 of the embodiment.
FIG. 10 is an explanatory diagram illustrating an example of a simulation result of evaluation of characteristics of the wireless communication system 100 of the embodiment.
Figure 12:
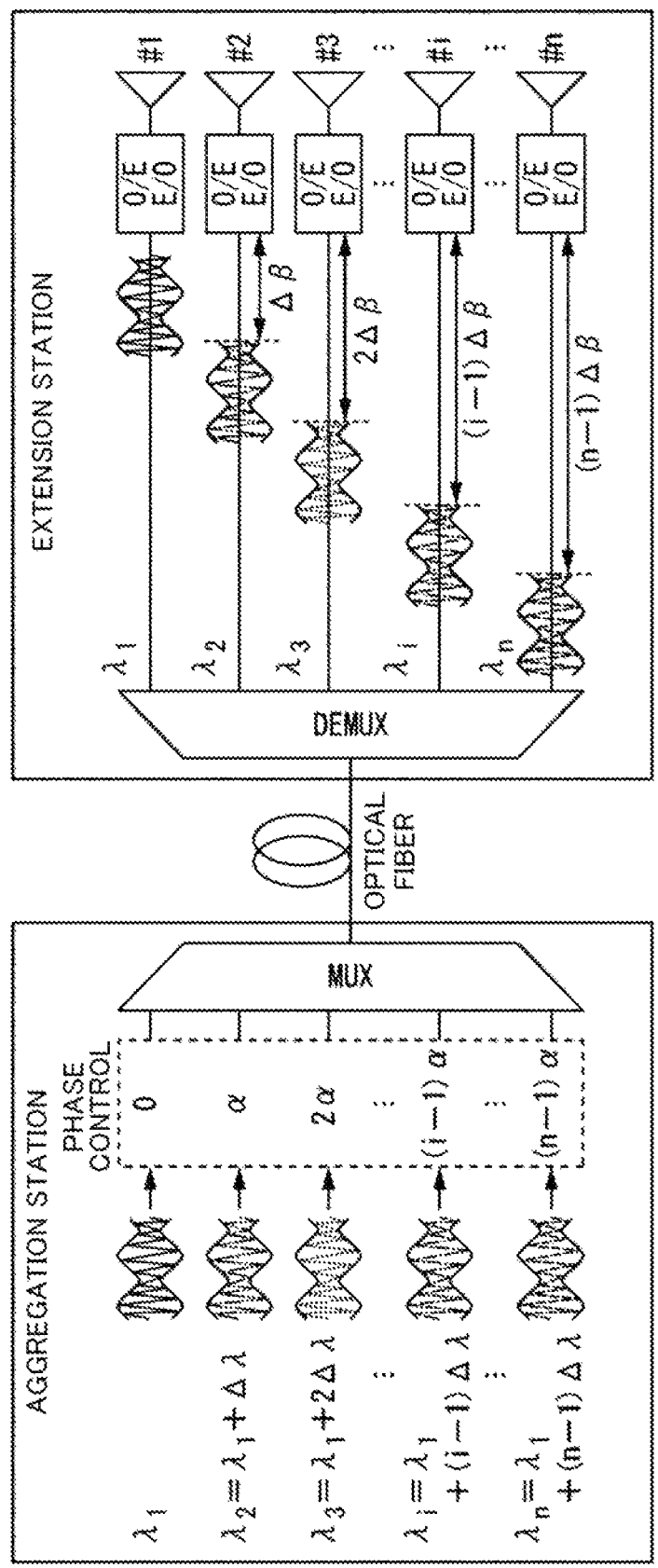
FIG. 12 is an explanatory diagram illustrating an example of a wireless communication system of a conventional example.
Figure 13:
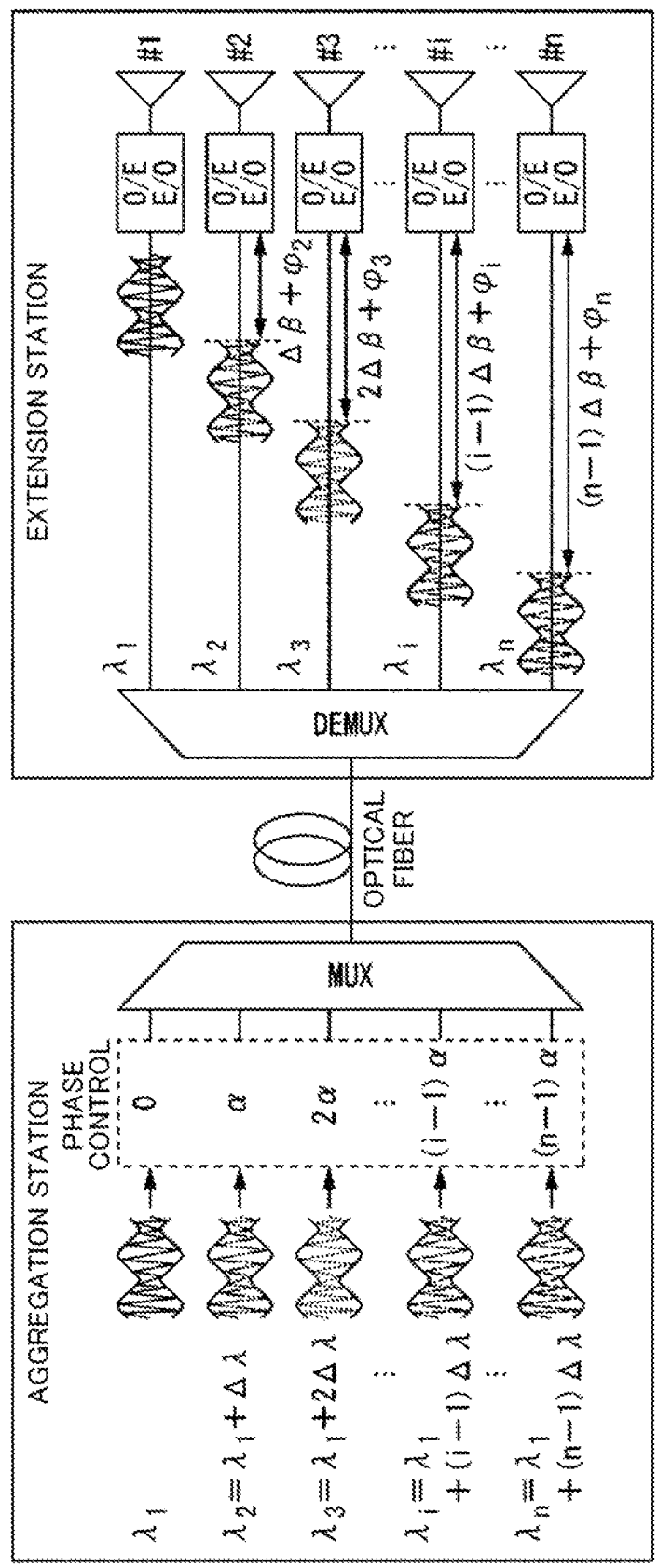
FIG. 13 is an explanatory diagram illustrating an example of a wireless communication system of a conventional example.

An example of simulation results of characteristic evaluation of the wireless communication system 100 will be described using FIG. 9 and FIG. 10. FIG. 9 is a first explanatory diagram illustrating an example of simulation results of characteristic evaluation of the wireless communication system 100 of the embodiment. FIG. 10 is a second explanatory diagram illustrating an example of simulation results of characteristic evaluation of the wireless communication system 100 of the embodiment.

More specifically, FIG. 9 is a diagram showing an example of results of evaluating characteristics of the wireless communication system 100 by computer simulation. FIG. 10 shows parameters used in computer simulation in which the results of FIG. 9 are obtained.

FIG. 9 also shows results of characteristic evaluation of the system described in PTL 1 as a comparison target. Specifically, the system described in PTL 1 is a system that does not acquire prior information. That is, the system described in PTL 1 is a wavelength fixed remote beamforming system.

"Number of array elements" in FIG. 9 represents the number of antenna elements 203. That is, the horizontal axis of FIG. 9 represents the number of antenna elements 203. The vertical axis of FIG. 9 represents a power level of peak loss due to a gain and beam collapse obtained by beamforming. "Ideal" in FIG. 9 represents a combined gain obtained by combining as many antenna elements as the number given by the "number of array elements." "BF gain" in FIG. 9 represents beamforming gains obtained by implementing the wireless communication system 100 and the system described in PTL 1. "Peak loss" in FIG. 9 represents a difference between "ideal" and "BF gain" (that is, a loss of combined gain caused by beam collapse). w/pre-BF represents a result of execution of wireless radio communication system 100, and w/o pre-BF represents a result of execution of the system described in PTL 1.

"RF" in FIG. 10 represents the frequency of an elementary electrical signal. "Array configuration" in FIG. 10 shows the arrangement of antenna elements 203-1 to 203-n. "Number of elements (all element BF)" in FIG. 10 represents the value of the number n of antenna elements. "Number of elements (pre-BF)" in FIG. 10 represents the number of antenna elements 203 included in one antenna element set. That is, "number of elements (pre-BF)" represents the value of m. "Wavelength band" in FIG. 10 represents the wavelength band of an optical signal. "Wavelength interval" in FIG. 10 represent a difference between a wavelength $\lambda_i$ and a wavelength $\lambda_{(i-1)}$. That is, it represents the value of $\Delta\lambda$. "Optical fiber length" in FIG. 10 represents the length of the optical fiber 3. "SMF" in FIG. 10 represents a generally laid single mode fiber.

FIG. 9 shows that beam collapse occurs as the number of antenna elements 203 increases and a peak level of a beam deteriorates due to the beam collapse in the case of the system described in PTL 1. That is, FIG. 9 shows that a beamforming gain cannot be obtained even if the number of antenna elements 203 increases in the system described in PTL 1. The beamforming gain differs from a gain and means a gain obtained by combining a plurality of signals whose phases have been adjusted.

FIG. 9 shows that deterioration of the peak level according to increase in the number of antenna elements 203 is reduced, and the beamforming gain according to increase in the number of antenna elements 203 is obtained in the case of the wireless communication system 100. That is, FIG. 9 shows that the wireless communication system 100 is more preferable than the system described in PTL 1 in that the beamforming gain associated with the number of antenna elements 203 is obtained.

The wireless communication system 100 in the embodiment configured in this manner acquires prior information, and applies a phase based on the acquired prior information to an elementary electrical signal in advance. Therefore, the wireless communication system 100 can reduce beam collapse caused by a phase rotation amount difference for each wavelength generated during optical fiber transmission.

Further, the wireless communication system 100 can maintain the advantages such as high wavelength utilization efficiency, beam control which does not require information on an optical fiber length, no control required in an extension station, and applicability to high-frequency bands, which are features of the remove beamforming technique of PTL 1, even when prior information is acquired by executing pre-beamforming. Further, when the wireless communication system 100 acquires prior information by executing pre-beamforming, beam collapse can be reduced using the operation of the remote beamforming technique of PTL 1.

Modified Examples

The prior information is not necessarily required to be obtained on the basis of feedback obtained from a communication destination in accordance with results of formation of a beam by the wireless communication system 100. The prior information may be obtained by the wireless communication system 100 on the basis of a result of reception of a signal transmitted from a communication destination by the wireless communication system 100. That is, the prior information may be acquired on the basis of a result of reception of a signal transmitted from a communication destination. Hereinafter, processing for acquiring the prior information on the basis of a result of reception of a signal transmitted from a communication destination will be referred to as reception type prior information acquisition processing.

Since the reception type prior information acquisition processing is processing in which the wireless communication system 100 receives a signal transmitted from a communication destination and the wireless communication system 100 obtains prior information on the basis of a reception result, the reception type prior information acquisition processing is also processing for acquiring prior information through communication with the communication destination.

On the other hand, processing in which the wireless communication system 100 forms a beam to transmit a signal and acquires prior information on the basis of feedback from a communication destination that has received the signal is referred to as transmission type prior information acquisition processing. The above-described pre-beamforming processing is an example of the transmission type prior information acquisition processing.

In the reception type prior information acquisition processing, the wireless communication system 100 receives a signal for beam sweeping transmitted from a communication destination, for example, while performing unit preprocessing according to formulas (8) and (9) and obtains an optimum phase adjustment amount interval $\Delta\alpha_q$. Then, the wireless communication system 100 calculates a phase adjustment amount for each antenna element 203 using formula (10) after completion of all unit preprocessing. In such a case, feedback from the communication destination for obtaining the prior information is not required.

When the wavelengths of optical signals used in downlink and uplink are identical, prior information in both the downlink and the uplink can be obtained by executing the transmission type prior information acquisition processing or the reception type prior information acquisition processing. Even when the wavelengths of optical signals used in the downlink and the uplink are different, prior information can be obtained by executing the transmission type prior information acquisition processing or the reception type prior information acquisition processing. That is, the wavelengths of optical signals used in the downlink and the uplink may not necessarily be identical. When optical wavelengths used in the downlink and the uplink are different from each other, phase adjustment amounts for the downlink and the uplink are obtained by executing transmission type prior information acquisition processing or reception type prior information acquisition processing.

The transmission-type prior information acquisition processing is applicable not only when frequencies of radio sections are identical in the downlink and uplink but also when the frequencies are different from each other. "Applicable" means that the prior information can be acquired when executed. A radio section means a space in which radio waves radiated by the antenna elements 203 propagate. That is, a radio section means a space between the wireless communication system 100 and another wireless communication system 100 or a wireless terminal that is a communication destination.

When the frequencies of radio frequency (RF) signals (that is, elementary electrical signals) in conversion from electrical signal into optical signals are different in the downlink and the uplink, different phase errors occur during transmission through the optical fiber 3 even if the optical signals have the same wavelength. Therefore, it is desirable to acquire prior information corresponding to each of the downlink and the uplink.

When first link information, second link information, and third link information are satisfied, prior information obtained by executing either the transmission type prior information acquisition processing or the reception type prior information acquisition processing may be used for both the downlink and the uplink. The first link information is a condition that optical signals used in the downlink and the uplink have the same wavelength. The second link information is a condition that a frequency difference between optical signals in the downlink and the uplink is within a predetermined difference. The third link information is a condition that deterioration due to a frequency difference is within a predetermined range.

Even when the wavelengths of optical signals are different in the downlink and the uplink, and when frequencies are different in a radio section, the transmission type prior information acquisition processing or the reception type prior information acquisition processing is executed, thereby acquiring prior information.

The transmission type prior information acquisition processing or the reception type prior information acquisition processing is also applicable when electro-optical conversion is performed after frequency conversion into an intermediate frequency. "Applicable" means that the prior information can be acquired when executed. Electro-optical conversion after frequency conversion into an intermediate frequency means that the circuit 15 performs frequency conversion of the frequency of an electrical signal into an intermediate frequency before conversion from the electrical signal into an optical signal is performed. In this manner, an electrical signal may be converted into an optical signal via an electrical signal at an intermediate frequency.

A system in which electro-optical conversion is performed after frequency conversion into an intermediate frequency is called an intermediate frequency over fiber (IFoF) system with respect to the RoF system. In the case of the RoF system, frequency conversion into an intermediate frequency is not performed before electro-optical conversion.

In the case of the IFOF system, it is possible to acquire prior information according to formulas (8) to (10), for example, as in the case of the RoF system. When intermediate frequencies (IFs) and optical signal wavelengths are identical in the downlink and the uplink in the IFOF system, prior information obtained by executing either of transmission type prior information acquisition processing or reception type prior information acquisition processing can be used for both the downlink and the uplink. A radio (i.e., beam) frequency in a radio section may be different in the downlink and the uplink.

Even when optical signal wavelengths, intermediate frequencies, and beam frequencies in a radio section are different in the downlink and the uplink in IFOF, prior information is acquired by executing the transmission type prior information acquisition processing or the reception type prior information acquisition processing. When either or both of optical signal wavelengths and intermediate frequencies are different, it is desirable to acquire prior information for each of the downlink and the uplink.

The number p of trials and the antenna elements 203 used in unit preprocessing according to formulas (8) and (9) satisfy the condition that the number p of trials is minimum. However, it is not always necessary to satisfy the condition that the number p of trials is the minimum, and a combination of antenna elements 203 used in each type of unit preprocessing is not necessary to satisfy formulas (8) and (9). For example, when n=10 and m=4, pre-beamforming processing shown in FIG. 11 below may be executed, for example.

FIG. 11 is an explanatory diagram illustrating an example of pre-beamforming processing in a modified example. FIG. 11 shows that a combination of antenna elements 203 in unit preprocessing is shifted by one element from a combination of antenna elements 203 in unit preprocessing one time before.

In each type of unit preprocessing, all predetermined beam patterns may be swept, or all beam patterns may not necessarily be swept. When it is necessary to shorten a beam scanning time, a technique for reducing a beam scanning time (number of times) may be applied. The technique for reducing a beam scanning time (number of times) is, for example, a technique for determining an approximate direction from a result of performing searching at intervals of 10 degrees at the time of scanning $\Delta\alpha$ from 0° to 360° first, and scanning only the vicinity of the determined direction at intervals of 1°.

It is not always necessary for the aggregation station 1 to store the interval $\Delta\alpha_q$ obtained through unit preprocessing in the downlink and to calculate the phase adjustment amount $z_i$. For example, a communication destination may store the interval $\Delta\alpha_q$ and calculate the phase adjustment amount $z_i$ and return only the obtained phase adjustment amount $z_i$ to the aggregation station 1.

The arrangement of antenna elements 203 may be a one-dimensional array antenna arrangement or a two-dimensional or more array antenna arrangement. Even in the case of two or more dimensions, the antenna elements 203 need to be combined in advance such that a phase difference between adjacent antenna elements 203 can be obtained in each type of unit preprocessing.

The aggregation station 1 may be implemented using a plurality of devices connected via a network such that they can communicate. In this case, the functional units included in the aggregation station 1 may be distributed and implemented in the plurality of devices. For example, the circuit 15 and the control unit 11 may be implemented in different devices. Further, the control unit 11 may be implemented using a plurality of information processing devices connected via a network such that they can communicate. In this case, the functional units included in the control unit 11 may be distributed and implemented in the plurality of information processing devices. For example, the prior information acquisition unit 121, the elementary electrical signal generation unit 122, and the compensation phase shift unit 123 may be implemented in different information processing devices.

The optical fiber 3 is an example of an optical transmission line. The aggregation station 1 is an example of an accommodation station device. The extension station 2 is an example of a base station device. A phase adjustment amount is a phase shift amount applied to a signal corresponding to each antenna element in the aggregation station.

All or some functions of the aggregation station 1 may be realized using hardware such as an application specific integrated circuit (ASIC), a programmable logic device (PLD), or a field programmable gate array (FPGA). A program may be recorded in a computer-readable recording medium. The computer-readable recording medium is, for example, a storage device such as a portable medium such as a flexible disk, a magneto-optical disk, a ROM, or a CD-ROM, or a hard disk built in a computer system. The program may be transmitted over a telecommunication line.

Although the embodiments of the present invention have been described in detail with reference to the drawings, specific configurations are not limited to these embodiments, and designs and the like within a range that does not deviating from the gist of the present invention are also included.

REFERENCE SIGNS LIST

100 Wireless communication system
1 Aggregation station
2 Extension station
3 Optical fiber
11 Control unit
12 Input unit
13 Output unit
14 Storage unit
15 Circuit
153-1 to 153-$n$ Phase shifter
154-1 to 154-$n$ Electro-optical converter
155-1 to 155-$n$ Light source
156-1 to 156-$n$ Photoelectric converter
157-1 to 157-$n$ Phase shifter
101 MUX (multiplexer)
102 DEMUX (demultiplexer)
110 Input information acquisition unit
120 Circuit control unit
121 Prior information acquisition unit
122 Elementary electrical signal generation unit
123 Compensation phase shift unit
130 Recording control unit
201 DEMUX (demultiplexer)
202 Converter
203 Antenna element
210 Switch
220 Photoelectric converter
230 Electro-optical converter
91 Processor
92 Memory

The invention claimed is:

1. A wireless communication system including an accommodation station device and a base station device connected to the accommodation station device through an optical transmission path and having n (n is an integer of 2 or more) antenna elements, wherein a plurality of optical signals having different wavelengths propagate through the optical transmission path, the wireless communication system comprising:
a processor; and
a storage medium having computer program instructions stored thereon, wherein the computer program instruction, when executed by the processor, perform processing of:
executing prior information acquisition processing for acquiring, as prior information, dispersion phase difference information that is information including a dispersion phase difference that is a phase rotation amount difference generated between adjacent optical signals on a wavelength axis due to propagation of the optical signals through the optical transmission path; and
executing compensation phase shift processing for reducing a difference from a phase difference reference that is a predetermined reference on the basis of the prior information with respect to the phase rotation amount difference generated between adjacent optical signals on the wavelength axis caused by wavelength dispersion in the optical transmission line;
wherein the prior information acquisition processing is processing for acquiring prior information through communication with a communication destination, and the prior information acquisition processing includes unit preprocessing which is processing executed on a predetermined set of m antenna elements (m is an integer greater than or equal to 2 and less than or equal to n) to determine, through communication with the communication destination, an interval $\Delta\alpha$ of phase adjustment amounts for forming an optimum beam having beam collapse smaller than a predetermined reference value, and the unit preprocessing is executed for all of antenna element sets.

2. The wireless communication system according to claim 1, wherein each of the plurality of optical signals is a result obtained by converting an electrical signal by electro-optical conversion using a plurality of wavelengths, and the compensation phase shift processing is processing for rotating phases of the optical signals or the electrical signals in advance such that the dispersion phase difference included in the prior information and the difference from the phase difference reference are reduced on the basis of the dispersion phase difference included in the prior information.

3. The wireless communication system according to claim 1, wherein the prior information acquisition processing is processing for acquiring prior information by communication with a communication destination, and the prior information acquisition processing includes a condition that unit preprocessing to be executed on m (m is n or less) predetermined antenna elements is executed p times represented by p=ceil ((n−1)/(m−1)), a condition that an antenna element represented by i=j+ (q−1) (m−1) is used in q-th unit preprocessing (q is an integer of 1 or more and p or less) when i and j (i is an integer of 1 or more and n or less, and j is an integer of 1 or more and m or less) are defined as identifiers for identifying antenna elements, and a condition that one or more antenna elements used in unit preprocessing one time before are included in second and subsequent unit preprocessing.

4. The wireless communication system according to claim 3, wherein the prior information acquisition processing includes antenna elements adjacent to the antenna element used in the unit preprocessing one time before if the number of antenna elements satisfying the relationship of i=j+ (q−1) (m−1) is less than m in the second and subsequent unit preprocessing.

5. The wireless communication system according to claim 1, wherein the prior information acquisition processing is processing for acquiring prior information by communication with a communication destination, and processing for acquiring prior information on the basis of a result of reception of a signal transmitted by the communication destination.

6. The wireless communication system according to claim 1, wherein each of the plurality of optical signals is a result of conversion of an electrical signal using a plurality of wavelengths by electro-optical conversion, and the electrical signal is converted into the optical signal via an electrical signal at an intermediate frequency.

7. A wireless communication method executed by a wireless communication system including an accommodation station device and a base station device connected to the accommodation station device through an optical transmission path and having n (n is an integer of 2 or more) antenna elements, wherein a plurality of optical signals having different wavelengths propagate through the optical transmission path, the wireless communication method comprising:

executing prior information acquisition processing for acquiring, as prior information, dispersion phase difference information that is information including a dispersion phase difference that is a phase rotation amount difference generated between adjacent optical signals on a wavelength axis due to propagation of the optical signals through the optical transmission path; and executing compensation phase shift processing for reducing a difference from a phase difference reference that is a predetermined reference on the basis of the prior information with respect to the phase rotation amount difference generated between adjacent optical signals on the wavelength axis caused by wavelength dispersion in the optical transmission line;

wherein the prior information acquisition processing is processing for acquiring prior information through communication with a communication destination, and the prior information acquisition processing includes unit preprocessing which is processing executed on a predetermined set of m antenna elements (m is an integer greater than or equal to 2 and less than or equal to n) to determine, through communication with the communication destination, an interval $\Delta\alpha$ of phase adjustment amounts for forming an optimum beam having beam collapse smaller than a predetermined reference value, and the unit preprocessing is executed for all of antenna element sets.

* * * * *